US012801272B2

(12) United States Patent
Sharma et al.

(10) Patent No.: US 12,801,272 B2
(45) Date of Patent: Nov. 17, 2026

(54) SYSTEM AND METHOD FOR SIMULATION AND DEPLOYMENT OF CUSTOMIZED USER INTERFACE (UI) FOR POWER SYSTEM CONTROLLER DEVICE

(71) Applicant: Vertiv Corporation, Westerville, OH (US)

(72) Inventors: Putli Sharma, Maharashtra (IN); Anup Jambhekar, Pune (IN)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 18/215,521

(22) Filed: Jun. 28, 2023

(65) Prior Publication Data

US 2024/0019995 A1 Jan. 18, 2024

(30) Foreign Application Priority Data

Jul. 12, 2022 (IN) ............................. 202211039972

(51) Int. Cl.
*G06F 3/04847* (2022.01)
*G06F 3/0482* (2013.01)

(52) U.S. Cl.
CPC ........ *G06F 3/04847* (2013.01); *G06F 3/0482* (2013.01)

(58) Field of Classification Search
CPC .... G06F 3/04847; G06F 3/0482; G06F 1/206; G06F 8/38

(Continued)

(56) References Cited

U.S. PATENT DOCUMENTS 5,367,619 A 11/1994 Dipaolo et al.
7,181,517 B1 * 2/2007 Iavergne ................ H04L 41/22 709/224

(Continued)

FOREIGN PATENT DOCUMENTS

CN 105493032 A 4/2016
CN 108304165 A 7/2018

(Continued)

OTHER PUBLICATIONS

Extended European Search Report dated Dec. 6, 2023; European Application No. 23185039.7.

(Continued)

*Primary Examiner* — Stephen S Hong
*Assistant Examiner* — Broderick C Anderson
(74) *Attorney, Agent, or Firm* — Sulter Swantz IP

(57) ABSTRACT

A method and system for web-based simulation of a customizable user interface (UI) for a power controller device provide a cloud-based web interface via which an end user may select a specific device, an operating region, and device features to be incorporated into a user interface (UI) for a controller device or mobile application wirelessly connected to said controller device. Based on the selected device type, regional configuration, and device features, a simulated UI is provided to the end user incorporating simulated data in one or more of a variety of desired data display formats. The end user may visualize the simulated UI via the web interface and customize the UI by reconfiguring layout features and/or adding branding elements. The system further provides a build of the finished UI downloadable by the end user to, and compatible with, the selected target device.

19 Claims, 7 Drawing Sheets

(58) Field of Classification Search
USPC .......................................................... 715/747
See application file for complete search history.

(56) References Cited

U.S. PATENT DOCUMENTS

| | | | | |
|---|---|---|---|---|
| 8,339,416 | B2 | 12/2012 | Katsukura et al. | |
| 8,407,661 | B2 | 3/2013 | Wang et al. | |
| 8,893,035 | B2 | 11/2014 | Biltz et al. | |
| 9,021,431 | B2 | 4/2015 | Laval et al. | |
| 9,116,709 | B2 | 8/2015 | Mohan et al. | |
| 9,547,291 | B2 | 1/2017 | Tran et al. | |
| 10,338,904 | B2 | 7/2019 | Desire | |
| 2005/0172261 | A1 | 8/2005 | Yuknewicz et al. | |
| 2006/0217905 | A1* | 9/2006 | Pai | G06F 1/26 702/60 |
| 2007/0213968 | A1 | 9/2007 | Nakagawa et al. | |
| 2014/0095654 | A1* | 4/2014 | Finnerty | G06F 15/17306 709/217 |
| 2015/0020006 | A1* | 1/2015 | Kotzer | G06F 16/9535 715/762 |
| 2019/0280943 | A1* | 9/2019 | Kaw | H04L 41/0843 |
| 2020/0028848 | A1* | 1/2020 | Gupta | G06F 21/105 |
| 2021/0216190 | A1* | 7/2021 | Vakil | G06F 16/953 |
| 2021/0352375 | A1* | 11/2021 | Fishman | H04N 21/47202 |
| 2021/0400117 | A1* | 12/2021 | Mishra | G06F 16/9537 |

FOREIGN PATENT DOCUMENTS

| | | | |
|---|---|---|---|
| CN | 110968299 | A | 4/2020 |
| CN | 110990002 | A | 4/2020 |
| CN | 114022234 | A | 2/2022 |
| WO | 2020055814 | A1 | 3/2020 |

OTHER PUBLICATIONS

European Patent Office, Office Action received in EP Application No. 23185039.7, Feb. 28, 2025, 8 pages.

* cited by examiner

SYSTEM AND METHOD FOR SIMULATION AND DEPLOYMENT OF CUSTOMIZED USER INTERFACE (UI) FOR POWER SYSTEM CONTROLLER DEVICE

CROSS-REFERENCE TO RELATED APPLICATIONS

This application claims priority under 35 USC § 365 to prior filed Indian provisional patent application 202211039972 filed Jul. 12, 2022. Said Indian provisional patent application 202211039972 is hereby incorporated by reference in its entirety.

TECHNICAL FIELD

The present disclosure is directed to systems and methods for power control and, more particularly, to user interfaces (UI) for power control devices.

BACKGROUND

Efficient and seamless data center operations depend on managing a variety of critical factors, a failure in any one of which may lead to service disruption or worse, e.g., power supply and distribution, backup power systems, thermal management, and/or surge protection. For example, data center architecture may include controllers for monitoring any or all of: distribution of alternating-current (AC) power supplies; rectifiers converting AC supply voltages into stable direct-current (DC) voltages; solar converters for supplementing grid-based power supplies; insulation and cooling systems; and backup batteries. Device and system monitors may be incorporated into controller devices physically incorporated into cabinets at the data center, or may be accessed remotely via applications downloadable to mobile devices.

Successful monitoring of a variety of critical factors underpinning data center operations depends on the controller user interfaces (UI) being understandable by, and compatible with, end users. Conventional controller systems may not allow an end user to interact with the final UI in advance, requiring multiple iterations of reviews and changes before the UI is accepted. Similarly, controller UIs are not generally customizable by an end user based on specific user needs or priorities.

SUMMARY

In a first aspect, a method for web-based simulation of a customizable user interface (UI) for a power controller device includes providing a cloud-based web application to an end user (e.g., via a desktop processing device or portable computing/communications device). The method includes receiving from the end user a device type selection for the power controller device. The method includes receiving from the end user a region designation associated with one or more region-specific or country-specific constraints of the power controller device. The method includes receiving from the end user, based on the selected device type and device constraints, a set of device features for monitoring aspects of the power controller device. The method includes generating, based on the selected device type (and application code associated therewith) and data display configuration data, a simulated user interface (UI) layout for the power controller device, the simulated UI layout incorporating the selected set of device features. The method includes displaying the simulated UI layout to the end user via the cloud-based web application.

In some embodiments, the method includes storing the simulated UI layout to cloud-based storage accessible to the end user.

In some embodiments, the method includes generating a build of the simulated UI layout configured for execution on the selected power controller device. The method includes providing the generated build for download to the power controller device by the end user via the cloud-based web application.

In some embodiments, the method includes generating the UI build as a containerized application.

In some embodiments, the power controller device may be a power supply controller, a power converter controller, a power rectifier controller, or a thermal monitoring controller.

In some embodiments, the method includes providing the generated UI build for download by the end user via a mobile computing/communications device wirelessly linked to the power controller device.

In some embodiments, the method includes receiving at least one customization of the displayed simulated UI layout from the end user via the cloud-based web application. The method includes revising the simulated UI layout based on the customization received from the end user.

In some embodiments, the method includes receiving via the cloud-based web application an end-user request to rearrange the device features displayed by the simulated UI layout.

In some embodiments, the method includes receiving from the end user via the cloud-based web application branding elements for incorporation into the simulated UI layout.

In a further aspect, a system for simulating a customizable user interface (UI) for a power controller device is disclosed. In embodiments, the system includes a cloud-based web interface via which an end user may select a specific device, an operating region, and device features to be incorporated into a user interface (UI) for a controller device or mobile application wirelessly connected to said controller device. Based on the selected device type, regional configuration, and device features, a simulated UI is provided to the end user incorporating simulated data in one or more of a variety of desired data display formats. The end user may visualize the simulated UI via the web interface and customize the UI by reconfiguring layout features and/or adding branding elements. The system further provides a build of the finished UI downloadable by the end user to, and compatible with, the selected target device.

In some embodiments, the system generates a build of the simulated UI layout configured for execution on the selected power controller device. The generated build may be provided for download to the power controller device by the end user via the cloud-based web application.

In some embodiments, the system generates the simulated UI layout build as a containerized application.

In some embodiments, the power controller device is a power supply controller.

In some embodiments, the power control device is a power converter controller.

In some embodiments, the power control device is a power rectifier controller.

In some embodiments, the power control device is a thermal monitoring controller.

In some embodiments, the system provides the generated UI build for download by the end user via a mobile computing/communications device wirelessly linked to the power controller device.

In some embodiments, the system receives from the end user a layout customization based on which the simulated UI layout is revised.

In some embodiments, the layout customization includes one or more of 1) an end-user request to rearrange the device features displayed by the simulated UI layout.

In some embodiments, the layout customization includes branding elements for incorporation into the simulated UI layout.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
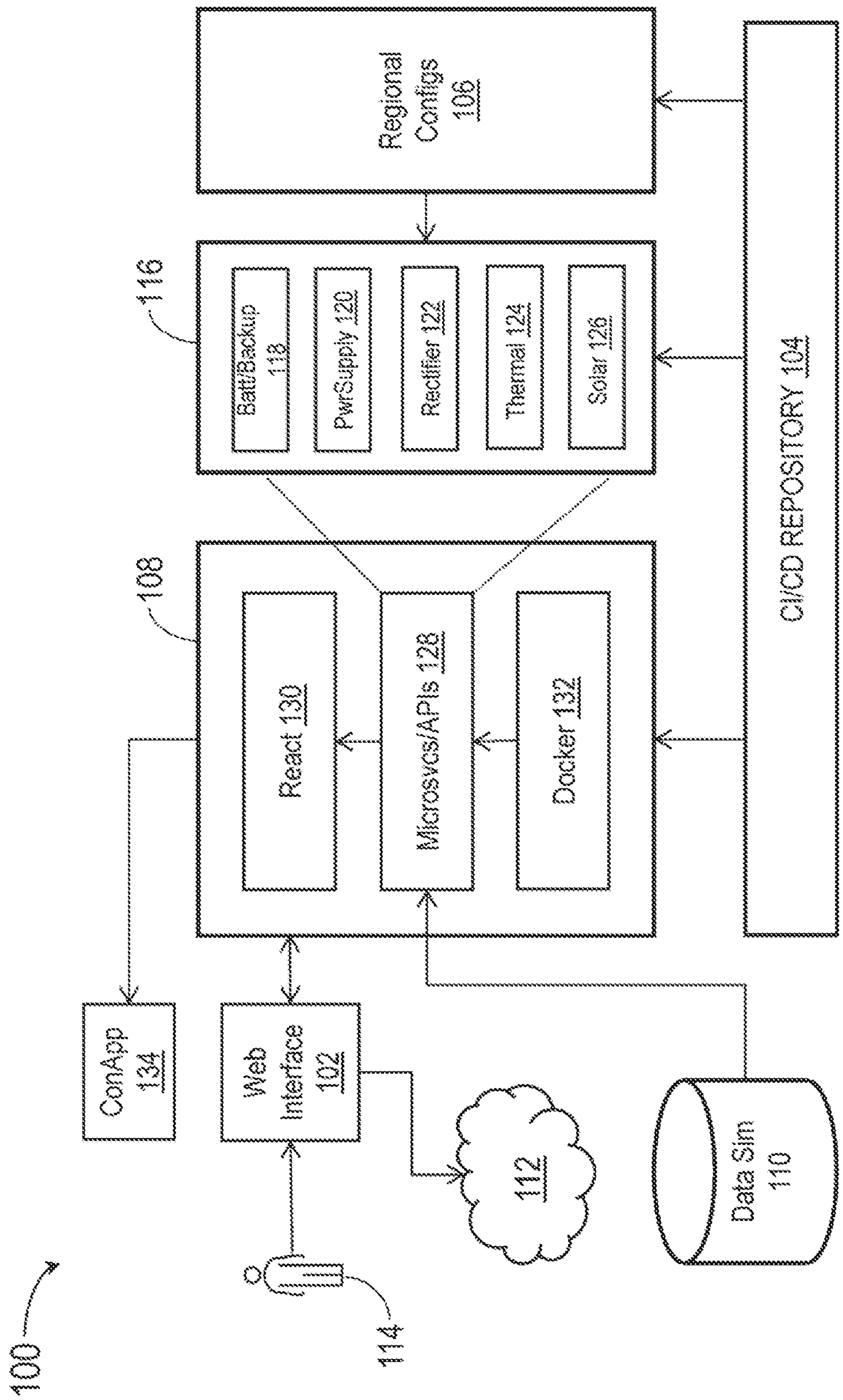
FIG. 1 is a block diagram of a system architecture for simulating a customizable user interface (UI) for a power controller device according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for simulating a customizable user interface (UI) for a power control device via cloud-based web application. For example, an end user may select compatible standard features based on their unique requirements. The cloud-based web application simulates a standard UI based on the selected features, which the user may further customize and save to the cloud. A revised simulated UI can be converted into a downloadable build usable by the actual device. By showing the end user a simulated UI tailored to their needs in near real time, cycle time in finalizing UI requirements may be significantly reduced.

Referring to FIG. 1, a system 100 for simulating a customizable user interface (UI) for an end user power controller device is shown. The system 100 may include web interface 102, continuous integration/continuous delivery (CI/CD) repository 104 (e.g., CI/CD library), regional configurations 106, application templates 108, configuration data simulator 110, and cloud-based storage 112.

In embodiments, the system 100 may provide an end user 114 with a web interface 102 via which the end user may provide parameters for a simulated user interface (UI; e.g., graphic user interface (GUI)) for a desired power controller device (e.g., target device). For example, the system 100 may generate a simulated UI displayable to the end user 114 via the web interface 102. The end user 114 may interact with the simulated UI and customize layout elements, saving the revised simulated UI to cloud-based storage 112. When the end user 114 revises the layout of the simulated UI to their satisfaction, the system 100 may generate a dummy build of the simulated UI downloadable by the end user and compatible with the actual target device. The web interface 102 may be a cloud-based web application executable on a desktop or laptop computer, or a mobile computing or communications device. For example, the mobile device may be configured for running an application providing a wireless link to the target device, via which operational parameters specific to the target device may be observed and/or adjusted by the end user 114. Similarly, the dummy build may be downloaded to and installed on the mobile device for use by the end user 114.

In embodiments, the end user 114 may provide the system 100 with a device type selection 116 and a regional designation via the web interface 102. For example, the device type selection 116 may identify, generally or specifically, the type of controller device the end user 114 wishes to simulate. For example, device type selections 116 may include battery/backup power controller devices 118, power supply controller devices 120, power rectifier controller devices 122, thermal controller devices 124 (e.g., for insulation management and/or coolant pump management); and/or solar converter controller devices 126. Regional configurations 106 based on regional designations may apply specific regional constraints based on the country, continent, or region in which the target device operates, e.g., Europe/Middle East/Africa (EMEA); North America (NA); Asia/Pacific (APAC).

In embodiments, the end user 114 may further select, via the web interface 102, specific device features to be incorporated by the system 100 into the simulated UI. For example, the end user 114 may wish to monitor, via the simulated UI, specific aspects of the target device, e.g., event logs, operational setpoints, sensor data, and/or graphic representations of the target device or device components monitored by a like controller (e.g., backup batteries, coolant pumps). In embodiments, the system 100 may retrieve (e.g., from the CI/CD repository 104) application templates 108 based on the specific device type selection 116 and any device features selected. For example, application templates 108 may incorporate microservice/API-based structures 128 separating customizable UI layer/s from the underlying business logic. In some embodiments, application templates 108 may further incorporate, e.g., React (130) or other like JavaScript libraries; and/or Docker (132) or other like container orchestration platforms, e.g., for generation of simulated UI builds as containerized applications 134 (e.g., for Kubernetes).

In embodiments, based on the selected device type 116 and selected device features, and any applicable regional constraints based on regional configurations 106, the system 100 may generate a simulated UI based on the configuration data simulator 110 compatible with a variety of desired display data formats. For example, the applicable device type selection 116 and/or application templates 108 may be compatible with one or more specific display data formats, e.g., extended markup language (XML); HTML/ART templates; and/or JavaScript Object Notation (JSON). The configuration data simulator 110 may incorporate various configuration data libraries and platforms (e.g., Redis, MongoDB) such that the generated simulated UI may confirm to the desired data display format/s.

Figure 2:
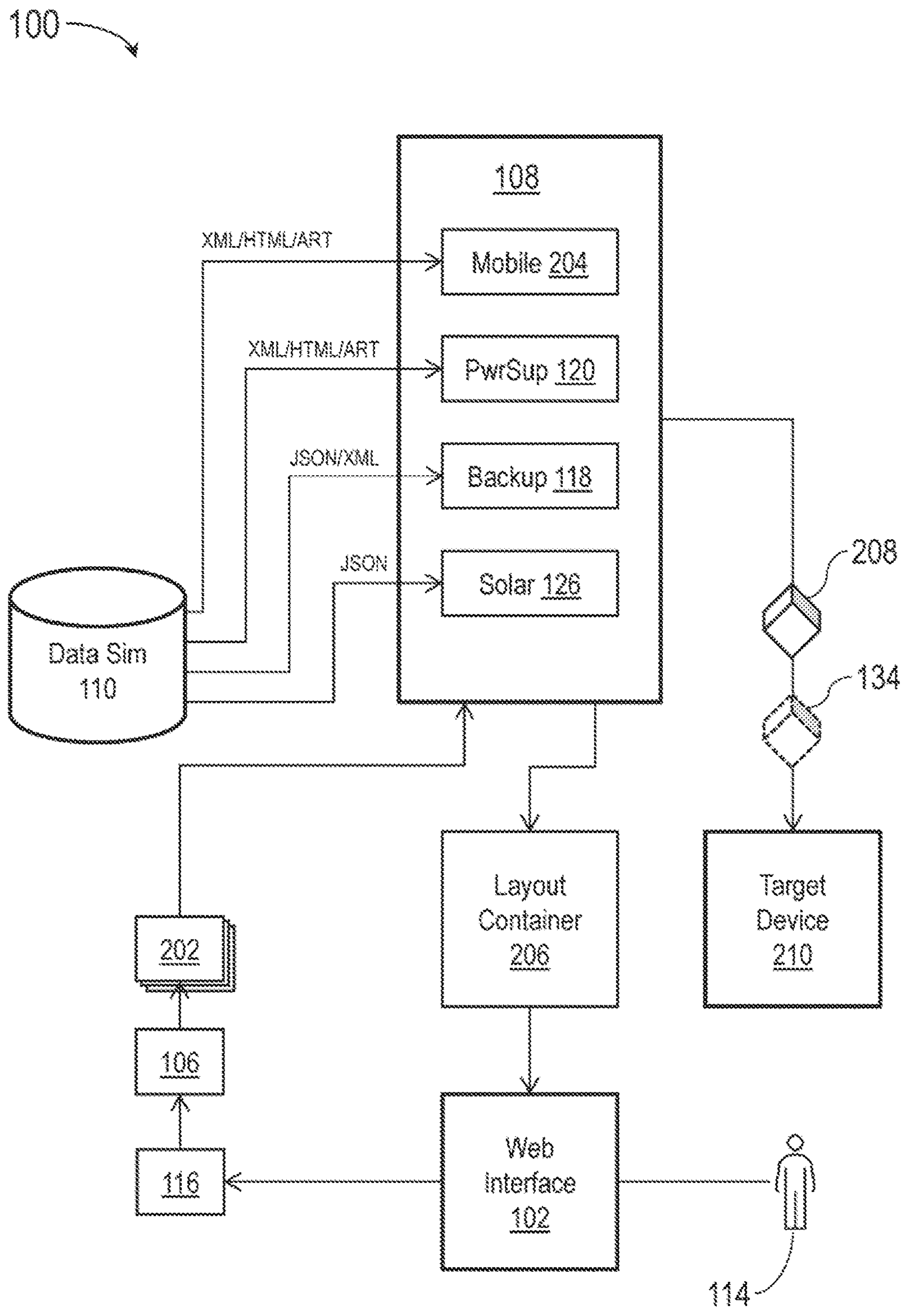
FIG. 2 is a diagrammatic illustration visualizing a simulation operation of the system of FIG. 1 according to example embodiments of this disclosure.

Referring to FIG. 2, the system 100 is shown.

In embodiments, the end user 114 may select, via the web interface 102, a device type 116, a regional configuration 106, and device features 202. For example, based on selections by the end user 114 and the applicable regional configurations 106, the system 100 may generate application templates 108 compatible with the selected device type 116 (e.g., battery/backup power controller devices 118, power supply controller devices 120, power rectifier controller devices (122, FIG. 1), thermal controller devices (124, FIG. 1), solar converter controller devices 126, or mobile devices 204) and for interacting with the selected device features 202. The configuration data simulator 110 may provide UI compatibility with the display data format desired by the end user 114, e.g., JSON, XML, HTML/ART, and/or combinations thereof.

In embodiments, the simulated UI may be provided (e.g., via layout container 206) for viewing and/or customization by the end user 114 via the web interface 102 (e.g., desktop, laptop, mobile). Similarly, when the simulated UI has been customized to the satisfaction of the end user 114 (and, e.g., saved to cloud-based storage (112, FIG. 1)), the system 100 may generate a build 208 of the simulated UI (which may be, or may include, a containerized application 134) downloadable by the end user 114 to the target device 210.

Figure 3A:
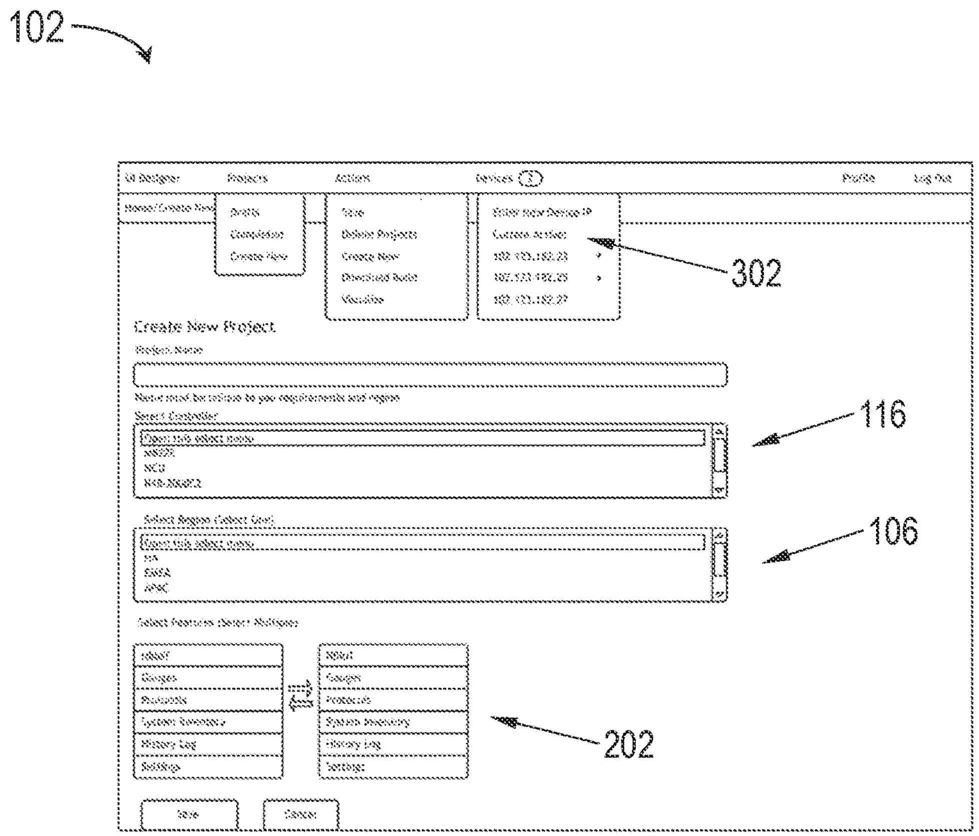
FIG. 3A is an illustration of a user interface for creating a simulated customized UI via the system of FIG. 1.
Figure 3B:
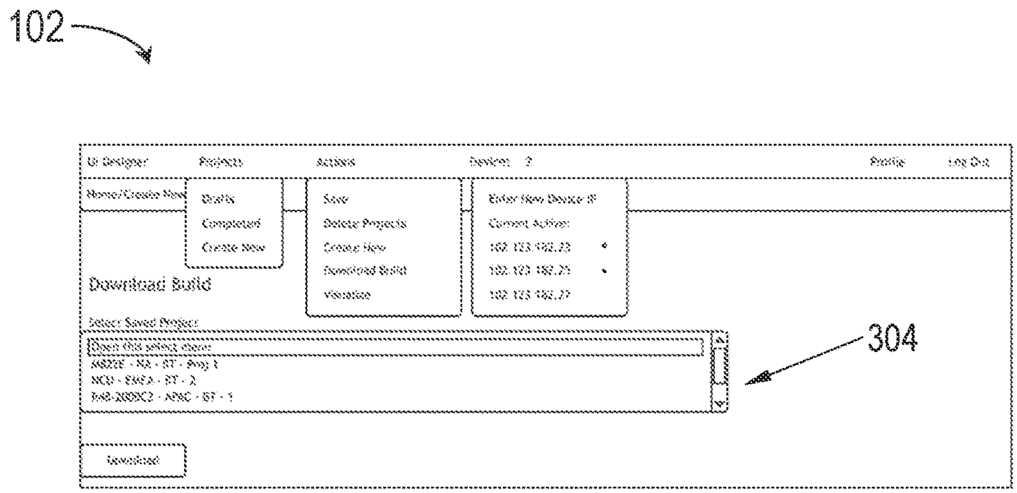
FIG. 3B is an illustration of a user interface for building a simulated customized UI via the system of FIG. 1.

Referring to FIGS. 3A and 3B, the web interface 102 is shown.

In embodiments, referring to FIG. 3A, the web interface 102 may allow the end user (114, FIG. 2) to select a device type 116 and a regional configuration 106. For example, when the device type 116 and regional configuration 106 are selected, the web interface 102 may provide the end user 114 with a menu of available device features 202 selectable by the end user. In some embodiments, the end user 114 may enter a new target device (210, FIG. 2) (e.g., associate a new target device with the end user) via its IP address (302) and associate attributes to the new target device, e.g., device type 116, regional configuration 106, device features 202. For example, once the target device 210 is entered, the end user 114 may select the new target device (210, FIG. 2) and any simulated UI associated with that target device, via the IP address 302.

When the end user 114 has selected device features 202 for incorporation into the simulated UI, the end user may save the simulated UI to cloud-based storage (112, FIG. 1), visualize the simulated UI via the web interface 102, or download a build (208, FIG. 2) of the simulated UI for execution on the target device (210, FIG. 2).

Referring also to FIG. 3B, the web interface 102 may allow the end user 114 to select a saved simulated UI (304) and download a build (208, FIG. 2) corresponding to the selected UI for installation and/or execution on the target device (210, FIG. 2).

Figure 4:
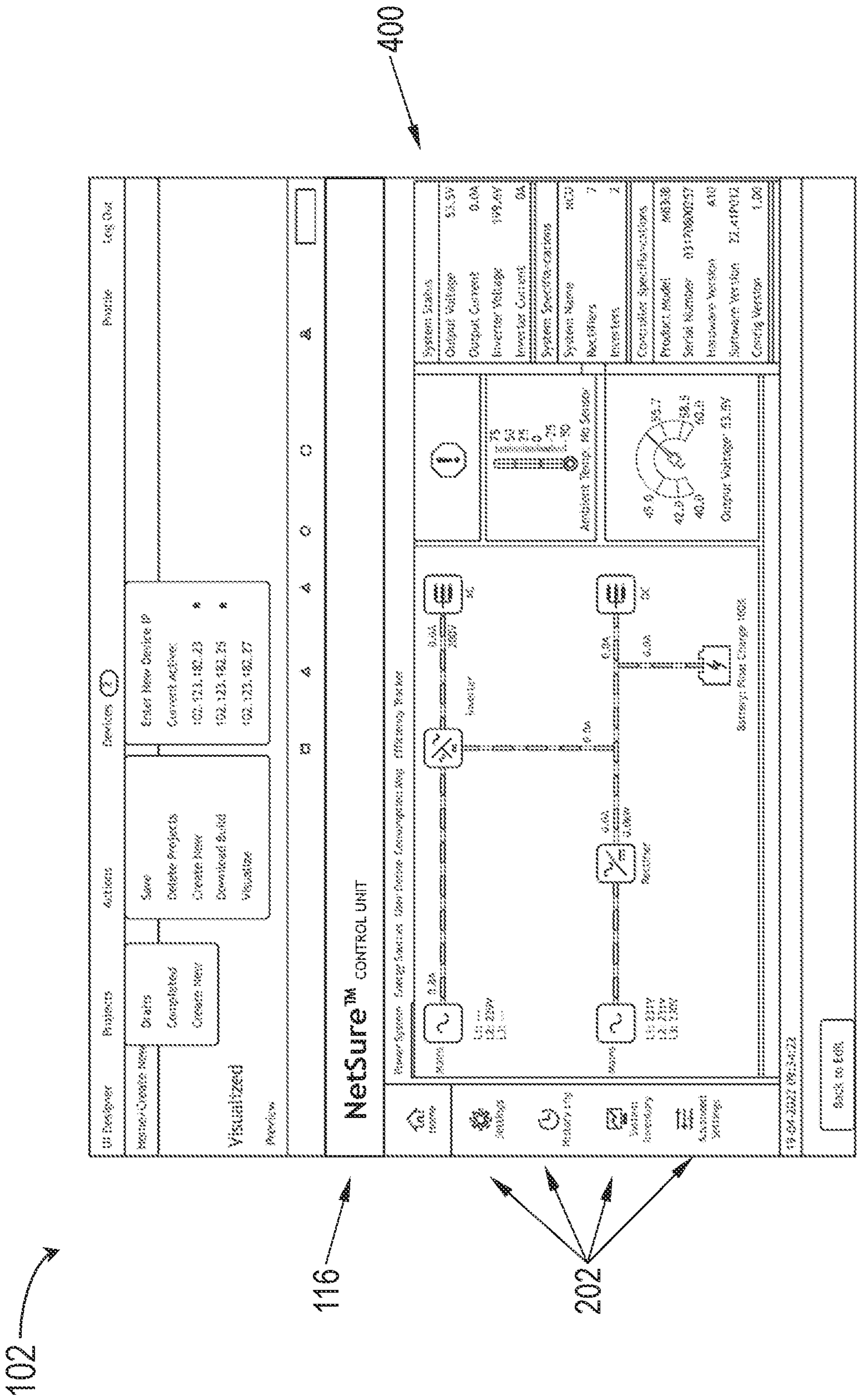
FIG. 4 is an illustration of a simulated customized user interface (UI) generated by the system of FIG. 1 according to example embodiments of this disclosure.

Referring now to FIG. 4, the web interface 102 is shown.

In embodiments, the web interface 102 may allow the end user 114 to visualize (400) a generated or selected simulated UI. For example, the visualized simulated UI 400 may be tailored to the specific device type 116, regional configuration 106, and device features 202 selected by the end user. In embodiments, the web interface 102 may further allow the end user to customize the visualized simulated UI 400, e.g., by reconfiguration of device features 202 and/or addition of customized branding elements.

Figure 5A:
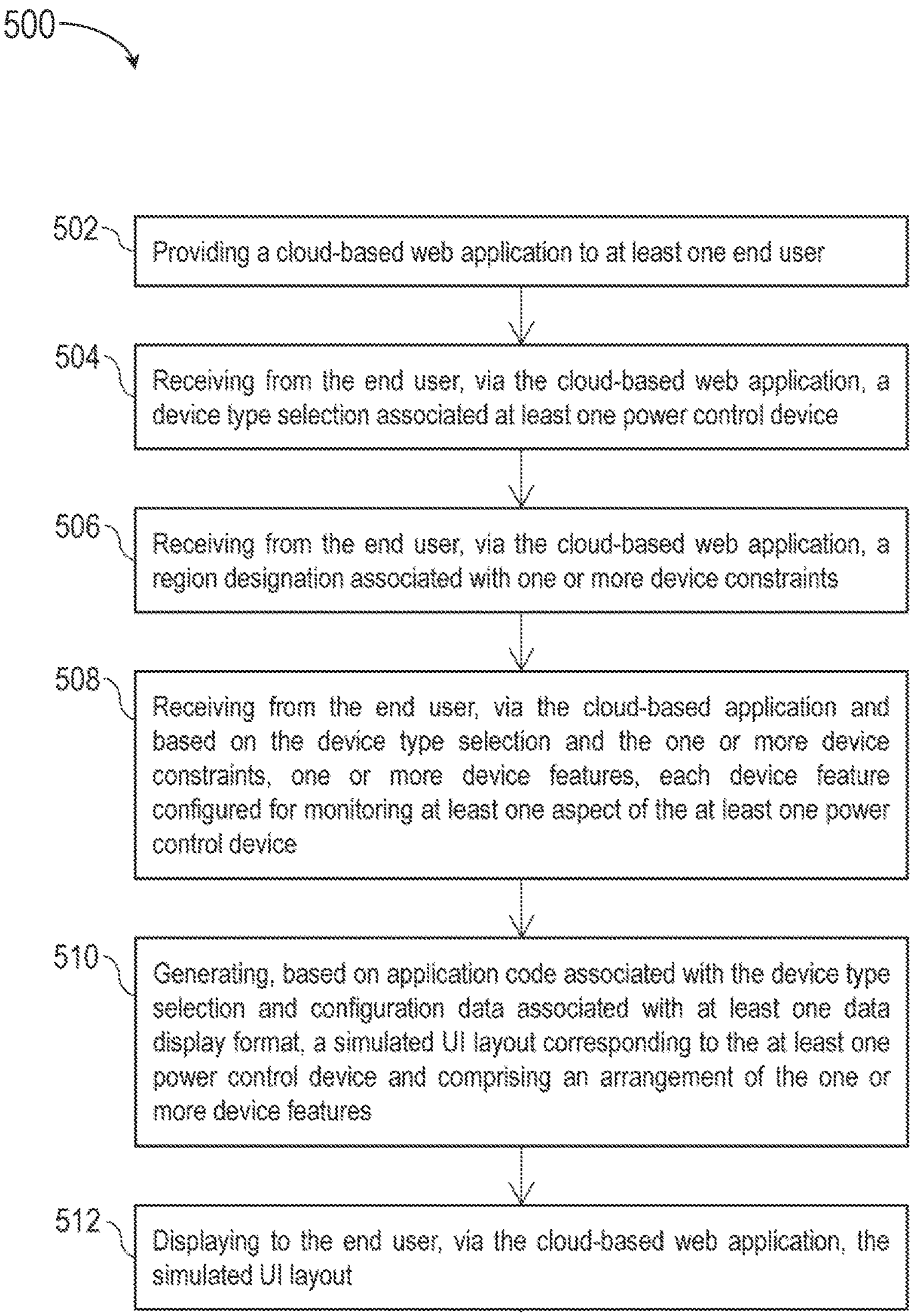
FIGS. 5A through 5D are process flow diagrams illustrating a method for simulating a customized UI for a power system controller device.

Referring now to FIG. 5A, a method 500 for simulating a customizable user interface (UI) for a power controller device may be implemented by the system 100 and may include the following steps.

At a step 502, a cloud-based web application is provided to an end user (e.g., via a web interface) for selection and customization of a UI for a target device. For example, the web interface may be accessed via a desktop/laptop computer or a mobile device.

At a step 504, the system receives a device type selection from the end user via the cloud-based web application. For example, the end user may select as a target device a power supply controller, backup battery controller, power rectifier controller, thermal management controller, solar converter controller, or mobile device wirelessly linked to a controller and capable of monitoring said controller via mobile application.

At a step 506, the system receives, via the cloud-based web application and from the end user, a region designation associated with regional constraints (e.g., based on the country or global region of operation).

At a step 508, the system receives, via the cloud-based web application and from the end user, a selection of one or more specific device features to be monitored by the simulated UI.

At a step 510, the system generates, based on application templates associated with the selected device type, device features, and regional constraints, and simulated configuration data associated with one or more desired data display formats, a simulated UI layout compatible with the selected target device and incorporating an arrangement of the selected device features.

At a step 512, the system displays the simulated UI layout to the end user via the cloud-based web application.

Figure 5B:
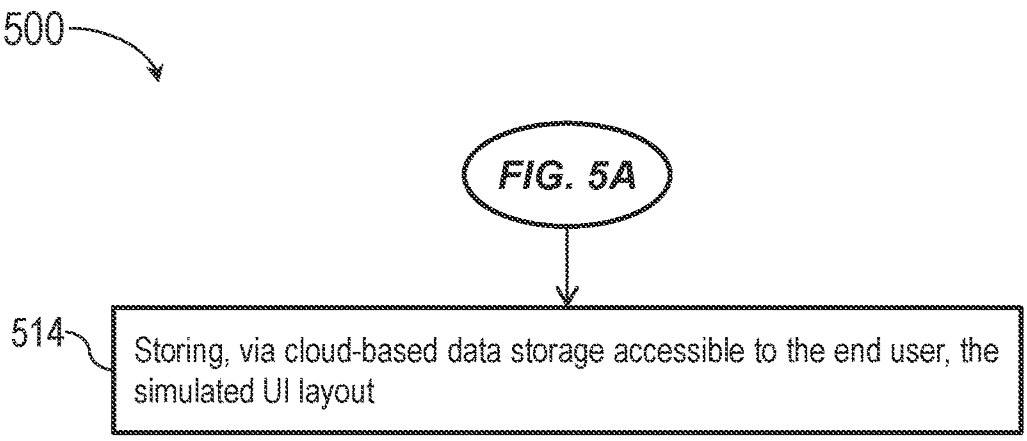

Referring now to FIG. 5B, the method 500 may include an additional step 514. At the step 514, the system stores the revised simulated UI layout to cloud-based storage.

Figure 5C:
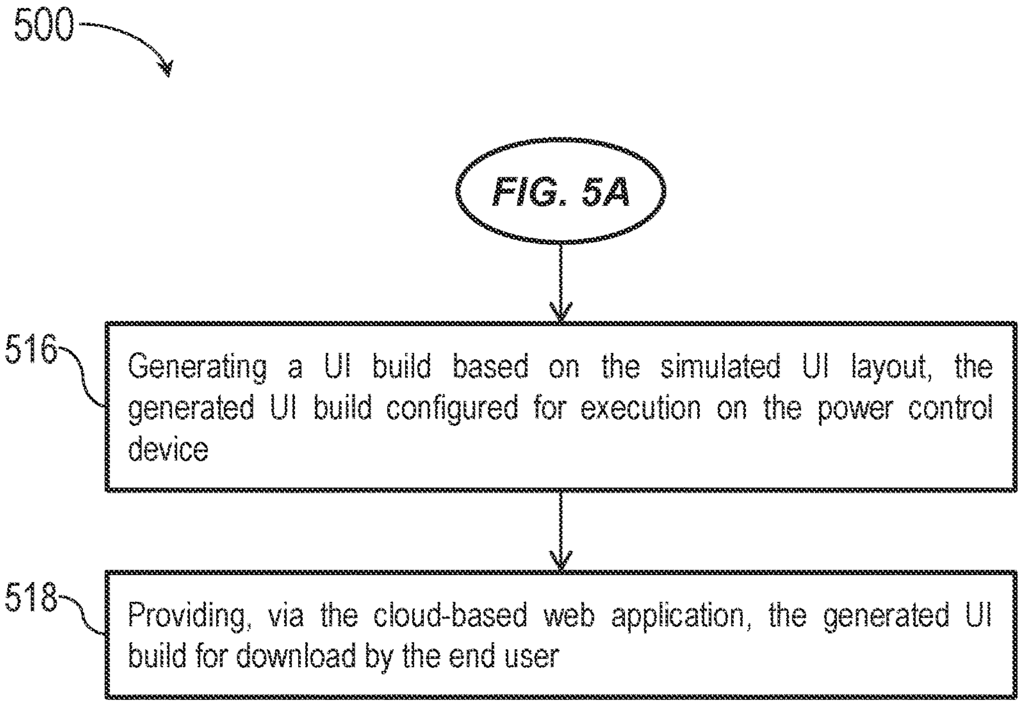

Referring also to FIG. 5C, the method 500 may include additional steps 516 and 518. At the step 516, the system generates a UI build based on the revised simulated UI layout, the generated build downloadable to and compatible with the selected target device.

At the step 518, the system provides the generated UI build for download to the target device by the end user.

Figure 5D:
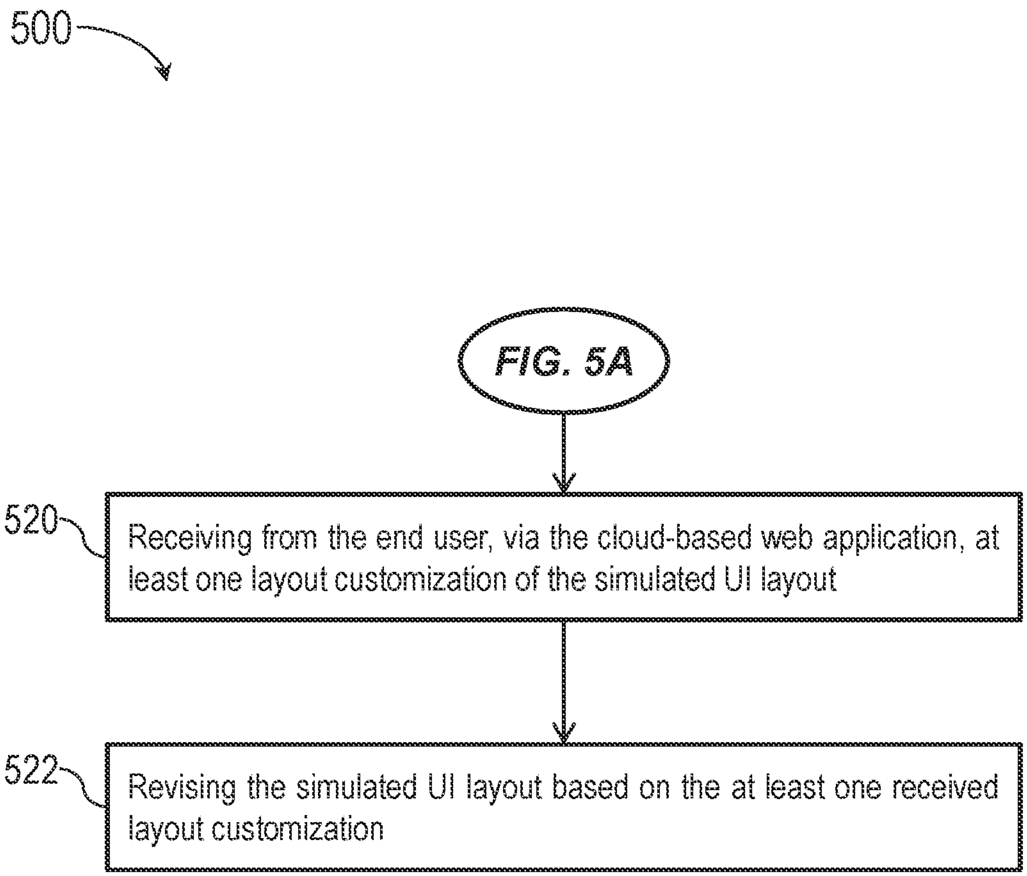

Referring also to FIG. 5D, the method 500 may include the additional steps 520 and 522. At the step 520, the system receives from the end user, via the cloud-based web application, layout changes or customizations to the simulated UI layout.

At the step 522, the system revises the simulated UI layout based on the received layout changes or customizations from the end user.

CONCLUSION

It is contemplated that the system may have numerous advantages. For example, the system may provide the end user with the ability to customize the user interface, as well as a final view of the user interface incorporating the desired data, in near real time. Similarly, the system will significantly reduce cycle time in incorporating and finalizing end user requirements and desired features.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

We claim:

1. A method for simulating a customizable user interface (UI) for a power control device, the method comprising:

providing a cloud-based web application to at least one end user via a mobile computing device;

receiving from the end user, via the cloud-based web application, a device type selection associated with at least one target device of a plurality of power control devices, the at least one target device capable of being monitored via the mobile device;

receiving from the end user, via the cloud-based web application, a region designation associated with one or more region-specific or country-specific constraints based on the country or region in which the at least one target device operates;

receiving from the end user, via the cloud-based web application and based on the device type selection and the region designation, one or more device features, each device feature configured for monitoring at least one aspect of the at least one target device via the mobile device;

generating, based on the device type selection, the region designation, and configuration data associated with at least one data display format, a simulated user interface (UI) layout corresponding to the device type selection and to the region designation, the simulated UI layout comprising an arrangement of the one or more device features, wherein the one or more monitored aspects of the at least one target device are observable and adjustable by the end user via the simulated UI layout;

displaying to the end user, via the cloud-based web application, the simulated UI layout;

generating, via the cloud-based web application, a UI build based on the simulated UI layout, the generated UI build configured for execution on the target device; and providing, via the cloud-based web application, the generated UI build for download by the end user.

2. The method of claim 1, further comprising:

storing, via cloud-based data storage accessible to the end user, the simulated UI layout.

3. The method of claim 1, wherein generating a UI build based on the simulated UI layout includes:

generating at least one containerized application based on the simulated UI layout.

4. The method of claim 1, wherein providing, via the cloud-based web application, the generated UI build for download by the end user includes:

providing the generated UI build for download by the end user to at least one mobile communications device in wireless communication with the at least one target device.

5. The method of claim 1, wherein the target device includes at least one of a power supply controller, a power converter controller, a power rectifier controller, or a thermal monitoring controller.

6. The method of claim 1, further comprising:

receiving from the end user, via the cloud-based web application, at least one layout customization of the simulated UI layout;

and revising the simulated UI layout based on the at least one received layout customization.

7. The method of claim 6, wherein receiving from the end user, via the cloud-based web application, at least one layout customization of the simulated UI layout includes:

receiving at least one request to rearrange the arrangement of the one or more device features.

8. The method of claim 6, wherein receiving from the end user, via the cloud-based web application, at least one layout customization of the simulated UI layout includes:

receiving from the end user at least one branding element for incorporation into the simulated UI layout.

9. A system for simulating a customizable user interface (UI) for a power control device, the system comprising:

one or more memory elements configured for storing:

one or more regional configurations;

one or more application templates associated with a plurality of power control devices;

one or more regional constraints associated with the plurality of power control devices;

and configuration data associated with one or more data display formats;

a mobile computing device including one or more processors; and at least one cloud-based web application executable by the one or more processors, the at least one cloud-based web application configured to:

receive, from an end user:

a device type selection corresponding to a target device of the plurality of power control devices, the target device capable of being monitored by the mobile device;

a region designation associated with one or more region-specific or country-specific constraints based on the country or region in which the target device operates; and one or more selected device features based on the device type selection and the region designation, wherein each selected device feature is configured for monitoring at least one aspect of the target device via the mobile device;

generate, based on the device type selection, the region designation, and configuration data associated with at least one data display format, a simulated user interface (UI) layout corresponding to the device type selection and to the region designation, the simulated UI layout comprising an arrangement of the one or more selected device features, wherein the one or more monitored aspects of the at least one target device are observable and adjustable by the end user via the simulated UI layout;

generate a UI build based on the simulated UI layout, the generated UI build configured for execution on the target device;

provide the generated UI build for download by the end user;

and display the simulated UI layout to the end user.

10. The system of claim 9, wherein the at least one cloud-based web application is configured to store the simulated UI layout to cloud-based storage accessible to the end user.

11. The system of claim 9, wherein the generated UI build includes at least one containerized application based on the simulated UI layout.

12. The system of claim 9, wherein the at least one cloud-based web application is accessible to the end user, and wherein the generated UI build is downloadable and executable by the end user, via at least one mobile communications device in wireless communication with the at least one target device.

13. The system of claim 9, wherein the target device is a power supply controller.

14. The system of claim 9, wherein the target device is a power converter controller.

15. The system of claim 9, wherein the target device is a power rectifier controller.

16. The system of claim 9, wherein the target device is a thermal monitoring controller.

17. The system of claim 9, wherein receiving the at least one layout customization of the simulated UI layout includes at least one a request to rearrange the arrangement of the one or more selected device features.

18. The system of claim 9, wherein receiving the at least one layout customization of the simulated UI layout includes at least one branding element provided by the end user for incorporation by the cloud-based web application into the simulated UI layout.

19. The system of claim 9, wherein the at least one cloud-based web application is configured to:

receive from the end user at least one layout customization of the simulated UI layout;

and revise the simulated UI layout based on the at least one layout customization.

* * * * *